Figure 1:
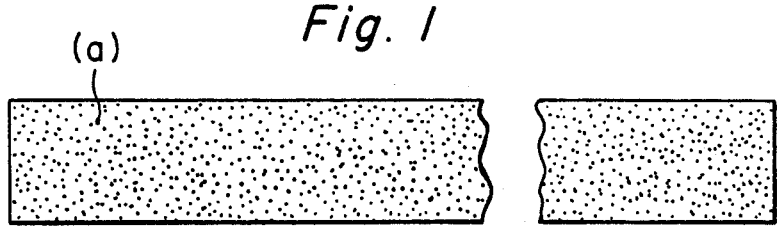

United States Patent [19]

Uogaeshi

[11] 4,021,258
[45] May 3, 1977

[54] CONCRETE STRUCTURE AND METHOD OF PREPARING SAME

[75] Inventor: Shinobu Uogaeshi, Kashiwara, Japan

[73] Assignee: Teijin Limited, Osaka, Japan

[22] Filed: Dec. 20, 1974

[21] Appl. No.: 535,123

Related U.S. Application Data

[62] Division of Ser. No. 398,466, Sept. 18, 1973, abandoned.

[30] Foreign Application Priority Data

Sept. 25, 1972 Japan .............................. 47-95078

[52] U.S. Cl. ................................................. 106/99
[51] Int. Cl.$^2$ ........................................ C04B 7/02
[58] Field of Search ....................................... 106/99

[56] References Cited

UNITED STATES PATENTS

| | | | |
|---|---|---|---|
| 3,650,785 | 3/1972 | Ball et al. ............................ | 106/99 |
| 3,753,751 | 8/1973 | Shannon ............................. | 106/120 |
| 3,758,319 | 9/1973 | Ergene ................................ | 106/99 |

*Primary Examiner*—J. Poer
*Attorney, Agent, or Firm*—Sherman & Shalloway

[57] ABSTRACT

A concrete structure containing in its body short fibers and at least one piece of cloth in an intertwined state is produced by disposing at least one piece of cloth in a form, pouring into said form a cement slurry composed of water, short fibers and a material selected from the group consisting of the hydraulic and air setting substances, allowing the cement slurry to set, and thereafter removing the form.

13 Claims, 4 Drawing Figures

CONCRETE STRUCTURE AND METHOD OF PREPARING SAME

This is a division, of application Ser. No. 398,466, filed Sept. 18, 1973 now abandoned.

This invention relates to concrete structures and a method of preparing same. More particularly, the invention relates to concrete structures containing in their body short fibers and pieces of cloth in a state of intertwinement and thus having a high degree of resistance to internal as well as external changes. The invention also relates to a method of preparing such structures.

As the hardening of a concrete structure proceeds, the moisture contained in the hydraulic substance is usually lost. In addition, a change in the volume of a concrete structure takes place as a result of the action of external conditions. In consequence, cracks are formed in the surface and interior of the structure. A growth takes place in the once formed cracks as the hardening proceeds to become large cracks which give rise to freezing and thawing, erosion, and efflorescence, with the consequence that the neutralization of the structure is accelerated and its properties are deteriorated. And especially in the case where these cracks are formed in the surface of the structure, the appearance is impaired to result in lowering the merchandise value of the product.

Hence, the prevention of the formation of cracks in concrete structures is a problem of utmost importance in the civil engineering and construction industry. Thus, various methods of improvement have been proposed in the past. As such methods, there can be mentioned such, for example, as that in which a swelling additive is incorporated in the green concrete (unhardened concrete), that of using a cement having small shrinkage, that of reducing the weight ratio of water to hydraulic substance (i.e., a method in which the proportion of the hydraulic substance in the green concrete is increased) or that in which reinforcing bars are embedded in the concrete structure thereby checking the shrinkage of the concrete as well as dispersing the internal stress based on the shrinkage.

However, none of the concrete structures obtained by these methods have achieved a level that is fully satisfactory from the standpoint of the quality of the structure as well as economics. Hence, there has been no instance to date in which success has been achieved in preventing these cracks.

It is therefore an object of this invention to improve on the foregoing shortcomings of the conventional concrete structures and provide fully serviceable concrete structures. Other objects and advantages of the invention will become apparent from the following description.

I found that the concrete structures containing in their body short fibers and pieces of cloth in a state of intertwinement was in accord with the foregoing objects of the invention and that such concrete structures could be prepared by first preparing the cloths and a homogeneous cement slurry composed of water, a hydraulic setting or air setting substance and short fibers and then allowing the cement slurry to set in such a state that sufficient contact between the cloths and the cement slurry in a still unhardened state is not hindered, with or without using a form.

It is especially preferred that the cloths are disposed in the surface zones of the concrete structure of the present invention. However, the cloth need not necessarily be disposed over the whole of the surface zones but may be disposed in only a part of the surface zones to meet the special requirements of the intended structure. By the expression "surface zone", as herein used, is meant not only the surface, i.e., the outermost surface of the structure in contact with the open air, but it is to be understood that the zone ranging to a slight depth inwardly from the surface of the structure is also included. The fabric that has been disposed in a surface zone such as described is visible through the thin cement mortar layer when viewed from the outside of the concrete structure.

The cloth can be disposed in not only the surface zones of the concrete structure but also in the interior zone of the structure. The cloth disposed in the inner zone need not be disposed in parallel to cloth disposed in the surface zones, there being imposed no restrictions as to the direction and form in which the cloth is disposed so long as a uniformity in the arrangement is maintained. The cloth need not necessarily be those of wide width but may be also those of narrow width such as a ribbon, tape, etc.

In the concrete structure of this invention, it is necessary that short fibers are present uniformly disposed in the body of the structure and that these short fibers are in sufficient intertwinement with the aforesaid cloths. For satisfying these requirements, the cloth and short fibers are chosen in the present invention in the following manner.

As the cloth, any can be used regardless of whether it is a woven, knit or nonwoven cloth or regardless of the size of the yarn or density of the yarn making up the fabric, provided that it is one in which the weave is sufficiently open as to permit the passage of the cement paste. However, from economic considerations most preferred is a cloth of coarse texture. Of these coarse-textured cloths, usually used with preference is the plain weave fabric in which both the warps and wefts are 5 – 30 count yarns and the density of both the warps and wefts is 10 – 24 yarns per inch. These fabrics may be those composed of such fibers as the cellulosic fibers (rayon and acetate), polyamide type fibers, polyvinyl alcohol type fibers, polyvinylidene chloride type fibers, polyvinyl chloride type fibers, polyester type fibers, polyacrylonitrile type fibers, polyethylene type fibers, polypropylene type fibers, polyurethane type fibers, metallic fibers, glass fibers, vegetable fibers (e.g., cotton and bast fibers), animal hair fibers, silk, or asbestos fibers.

On the other hand, as the short fibers, any of those mentioned hereinabove as making up the cloths can be used regardless of whether they are natural, semi-synthetic or synthetic fibers or regardless of whether the fibers are organic or inorganic fibers, provided that they are those having a diameter of 5 – 100 microns and a length of 5 – 30 mm, and preferably 10 – 20 mm. When the short fibers are of a diameter greater than 100 microns or of a length shorter than 5 mm, difficulty is experienced in their becoming intertwined with the cloth. On the other hand, when the diameter of the short fibers is smaller than 5 microns or their length exceeds 30 mm, difficulty is experienced in uniformly dispersing the short fibers in the body of the concrete structure. The short fibers are preferably used in an amount of 0.2 – 2% by weight based on the cement contained in the concrete structure.

The body of the concrete structure is formed by a hardened product of cement containing aggregates. As the cement, all of the hydraulic setting or air setting substances that have usually been used hitherto in the civil engineering and construction fields can be used. For example, conveniently usable are portland cement, magnesia cement, alumina cement and the mixtures of siliceous sand and lime (this latter mixture sets by a hydrothermal reaction). Again, if necessary, the body of the concrete structure can also be incorporated with air bubbles in accordance with conventional procedures.

In the case of the invention concrete structure in which the cloth is present in the surface zones of the structure, cracks do not readily form in the surface. Thus, its apparent value is enhanced. On the other hand, in the case of the invention concrete structure in which the cloth are present in the surface zones as well as the inner zone of the structure, the formation of cracks can be prevented in not only the surface of the structure but also in the inner part thereof. That the concrete structure of this invention demonstrates such crack prevention effects as described is presumably due to the following reason. That is, with the short fibers being uniformly dispersed in the body of the structure and in intertwinement with the fabric present in the body, the internal stress that is set up during the hardening and shrinkage of the cement slurry is dispersed throughout the structure without concentrating locally. Hence, the formation of cracks is prevented. The importance of the intertwinement of the short fibers with the cloth in this invention is apparent from the fact that even though a cloth is adhered with mortar to either the surface of a conventional hardened concrete structure or the surface of a hardened concrete structure in which have been dispersed short fibers, such an adhesion of a cloth is of no use at all in preventing the surface cracks of the aforesaid structures, since there is no intertwinement at all of the short fibers with the cloth.

As noted hereinabove, cracks do not readily form in the concrete structure of the present invention. In addition, the invention concrete structure possesses resistances to freezing and thawing, erosion and efflorescence. Especially, in the case of a thin sheet of the order of 0.5 – 5 cm, it excels greatly in its elastic properties and it is far superior to the other thin sheets, inclusive of reinforcing bars of iron. Hence, it is possible to use the invention concrete structures for various purposes not known by past experiences.

In preparing the invention concrete structures, various modes can be employed depending upon its class. Generally speaking, it is possible to prepare the invention concrete structures that contain in their body the short fibers and cloths in intertwinement with each other by a procedure consisting of preparing the cloths and a homogeneous cement slurry composed of water, a hydraulic or air setting substance and short fibers, and then, with or without using a form, allowing the cement slurry to set in such a state that sufficient contact between the cloths and the cement slurry in its still unhardened state is not hindered, preferably in a state such that the cloths are enabled to occupy in the final concrete structure positions in the surface zones (and the interior zone). The procedures, when described specifically for each of the classes of structures, are as follows.

In a typical method of preparing prefabricated concrete structure, pieces of cloth are arranged in a form, the form is filled with the cement slurry composed of water, a hydraulic or air setting substance and short fibers, and after the cement slurry has set, the form is removed. In arranging the cloths in the form, when the cloths are disposed adjacent the inner walls of the form, an invention concrete structure having cloths present in the surface zones is obtained. On the other hand, when a piece of cloth is disposed adjacent the inner wall of the form and, at the same time, a separate piece of cloth is disposed in the space about midway between the walls of the form (e.g., by means of suspension), an invention concrete structure in which cloths are present in the surface zone as well as the inner zone is obtained. The form may be either a vertical or horizontal form in this case.

Another method of preparing prefabricated concrete structures comprises laying a cloth at the bottom of a form, pouring atop this cloth horizontally and to a desired thickness a cement slurry composed of water, a hydraulic or air setting substance and short fibers, allowing the cement slurry to set and thereafter removing the form. It is possible according to this method to prepare readily the invention structure of sheet form in which a cloth is present in one of the surface zones of the structure.

As an adaptation of the foregoing method, the following procedure can be employed. Using a horizontal form of the same kind, a cloth is placed at the bottom of the form, a cement slurry composed of water, a hydraulic or air setting substance and short fibers is poured to a desired thickness, a cloth is placed atop the poured cement slurry before it sets, the foregoing procedure being repeated for a desired number of times, followed by allowing the cement slurry to set and thereafter removing the form. In this case, there is obtained an invention structure of sheet form wherein there is present a cloth at both the top and bottom surface zones as well as at least one cloth in the interior of the structure.

As a method of building a concrete structure at the site of construction, that consisting of pouring a cement slurry composed of water, a hydraulic or air setting substance and short fibers to a desired thickness at the site of construction, with or without using a form, placing a cloth atop the poured cement slurry before it sets, and thereafter allowing the cement slurry to set can be employed. By operating in this manner, an invention concrete structure in which there is present a cloth in the upper surface zone is built.

On the other hand, as another method of building a concrete structure at the site of construction, the following procedure may be adopted; i.e., that comprising pouring a cement slurry composed of water, a hydraulic or air setting substance and short fibers to a desired thickness at the site of construction, with or without using a form, placing a cloth atop the poured cement slurry before it sets, repeating this operation a desired number of times, followed by allowing the cement slurry to set. In this case, there is built an invention concrete structure at the site of construction wherein there are present not only a cloth in the upper surface zone but also at least one piece of cloth in the inner zone of the structure.

In practicing the invention method, it is preferred that the cloth to be used is treated in advance with an aqueous solution of a water-soluble resin such, for example, as methyl cellulose, hydroxypropylmethyl cellulose, polyvinyl alcohol and polyvinylpyrrolidone. When a cloth treated with such a water-soluble resin is used, the compatibility between the cloth and the cement slurry is improved, with the consequence that the intertwinement between the cloth and the short fibers dispersed in the cement slurry is promoted. In consequence, a concrete structure having strong resistance to external conditions can be obtained. And especially in the case of a concrete structure having a cloth in the surface zone, the formation of cracks at the surface rarely ever occurs.

The cement slurry used in preparing the concrete structures of the present invention may also contain, in addition to the water, hydraulic or air setting substance and short fibers, for example, a light weight aggregate such as expanded shale, a coarse aggregated such as gravel, a fine aggregate such as sand and a colorant such as pigments in accordance with the intended use of the resulting product. Further, this cement slurry may also contain a chemical for accelerating its hardening or a chemical for rapidly developing the strength of the hardened product.

The invention concrete structure has the following merits as a result of the fact that the structure contains short fibers and cloths in a state of intertwinement in its body.

1. Abnormal drying of the surface zones does not take place readily, and hence the formation of cracks due to drying and shrinkage is effectively prevented.

2. The invention concrete structures have an impact strength about 1.5 – 2 times that of the conventional concrete structures, and their flexural strength demonstrates an improvement of 10 – 15%.

3. The invention concrete structure having a cloth present in the surface zones excels especially in its smoothness, and the erosion of the surface by means of a parting agent or the peeling off of the surface due to the evolution of heat during the hydration reaction hardly ever occurs. Further, such surface decorative agents as paints readily adhere to the surface of the invention concrete structures.

Figure 2:
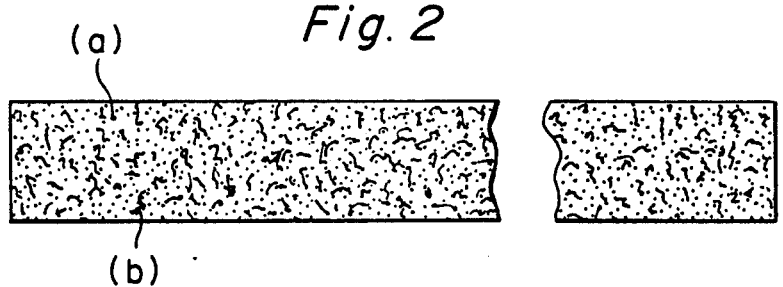
Figure 3:
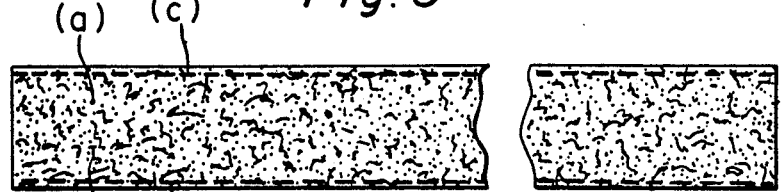
Figure 4:
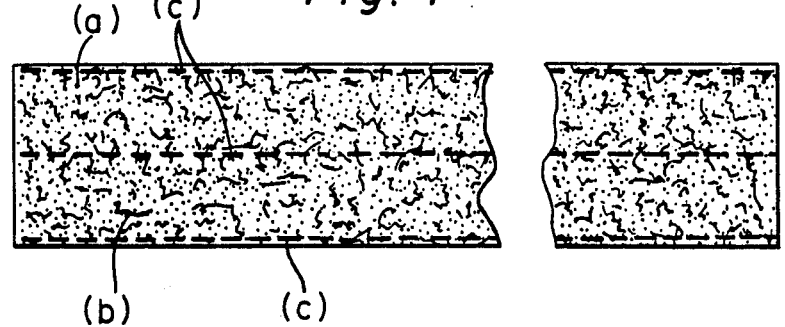

The following nonlimitative examples are given for more specifically illustrating the invention, reference being had to the accompanying drawings, wherein:

FIGS. 1 – 3 are fragmentary sectional views of the structure of sheet form obtained in Example 1, FIGS. 1 – 2 being those of control experiments and FIG. 3 being that in accordance with the present invention; and FIG. 4 is a fragmentary sectional view of a structure of sheet form in accordance with the present invention that was obtained in Example 4.

EXAMPLE 1

450 Parts by weight of portland cement and 146 parts by weight of sand were mixed with 216 parts by weight of water (water to cement ratio = 0.48) to prepare a mortar.

The foregoing mortar was poured into a vertical form having the inside dimensions of 900 × 900 × 25 mm and, after curing the mortar for 24 hours at 70% relative humidity and 25° C., the form was removed. Thus was made a structure of sheet form having the dimensions of 900 × 900 × 25 mm. This is designated sample I. Sample I, as shown in FIG. 1, is a sheet structure composed of only the hardened cement mortar (a).

450 Parts by weight of portland cement, 146 parts by weight of sand and 2.25 parts by weight of short fibers of polyvinyl chloride 40 microns in diameter and 15 mm in length were mixed along with 216 parts by weight of water.

The resulting short fiber-containing mortar was poured into a form of the same kind as that used hereinbefore and was cured under identical conditions as indicated above, with the consequence that a sheet structure having the dimensions of 900 × 900 × 25 mm was obtained. This is designated sample II. Sample II, as shown in FIG. 2, is a sheet structure composed of the hardened cement mortar (a) in which have been uniformly dispersed the polyvinyl chloride short fibers (b).

Next, to the opposing inner walls of a form of the same kind as that used above (two surfaces having the dimensions of 900 × 900 mm) were adhered to the whole of the surfaces plain weave fabrics of polyvinylformal wherein are present 20 count yarns at a density of 12 ends per inch. Into the so prepared form was poured the same short fiber-containing mortar as that used hereinabove, followed by curing the poured mortar under identical conditions as described hereinbefore to make a sheet structure having the dimensions of 900 × 900 × 25 mm. This is designated sample III. Sample III, as illustrated in FIG. 3, is a structure characterized in that at the top and bottom surface zones of a sheet material composed of hardened cement mortar (a) in which have been uniformly dispersed polyvinyl chloride short fibers (b) there are present the foregoing plain weave fabrics (c) in a state of intertwinement with said short fibers (b).

Two sheets of each of the samples I, II and III were prepared, and each sheet was supported horizontally with the point of support being 30 cm from one end of the sheet, after which the sheet was left to stand in this state in open air for 16 weeks (April – July), the state of crack formation being observed during this period.

The results obtained are shown in Table 1. In the table the numerical values indicate the number of weeks that have elapsed (average value of two sheets). For instance, in the case of sample I, it is shown that an intersection of cracks takes place in six weeks.

Table 1

| Sample | No formation of cracks | Slight formation of fine cracks | Slight formation of cracks due to drying and shrinkage | Slight formation of cracks with efflorescence | Intersection of cracks | Cracks proceeding into interior | Formation of cracks in great numbers |
| --- | --- | --- | --- | --- | --- | --- | --- |
| I (Control) | 0 | 2 | 3 | 4 | 6 | 9 | 16 |
| II (Control) | 0 | 2 | 6 | 9 | — | — | — |
| III | 0 | 6 | 16 | — | — | — | — |

Table 1-continued

| Sample | No formation of cracks | Slight formation of fine cracks | Slight formation of cracks due to drying and shrinkage | Slight formation of cracks with efflorescence | Intersection of cracks | Cracks proceeding into interior | Formation of cracks in great numbers |
|---|---|---|---|---|---|---|---|
| (Invention) | | | | | | | |

*Simple cracks are those which are relatively long and thick and are cracks having few branches as compared with the hair cracks.

In the case of sample III, which is a concrete structure obtained in accordance with the present invention, there was only a slight formation of cracks due to drying and shrinkage even after 16 weeks. In contrast, in the case of the control samples I and II, there were formations of cracks even after three and six weeks, respectively. In the former case, there was the formation of great number of cracks after 16 weeks, while in the latter case the formation of simple cracks accompanied with efflorescence was noted by the time 9 weeks had elapsed.

EXAMPLE 2

329 Parts by weight of portland cement, 780 parts by weight of sand and 1,054 parts by weight of gravel were mixed with 194 parts by weight of water (water to cement ratio = 0.59) to prepare a green concrete.

The foregoing concrete was poured into a vertical form having the inside dimensions of 900 × 900 × 50 mm and, after curing the concrete for 25 hours at 70% relative humidity and 25° C., the form was removed, thus obtained a sheet structure having the dimensions of 900 × 900 × 50 mm. This is designated sample I.

329 Parts by weight of portland cement, 780 parts by weight of sand, 1,054 parts by weight of gravel and 1.1 parts by weight of polyvinylformal short fibers 36 microns in diameter and 15 mm in length were mixed with 194 parts by weight of water.

The resulting short fiber-containing green concrete was poured into a form of the same kind as that used hereinbefore and was cured under identical conditions as indicated above. Thus was obtained a sheet structure having the dimensions of 900 × 900 × 50 mm. This is designated sample II.

Next, to the opposing inner walls of a form of the same kind as that used above (two surfaces having the dimensions of 900 × 900 xx) were adhered to the whole surfaces plain weave fabrics of polyvinylformal wherein are present 20 count yarns at a density of 12 ends per inch. Into to the so prepared form was poured the same short fiber-containing green concrete as that used hereinbefore, followed by curing the poured concrete under identical conditions as indicated hereinbefore, thus making a sheet structure having the dimensions of 900 × 900 × 50 mm. This is designated sample III.

Two sheets of each of the samples I, II and III were prepared, and each of the sheets was supported horizontally with the point of support being 30 cm from one end of the sheet, after which the sheet was left to stand in this state in open air for 16 weeks (April – July), the state of the crack formation during this period being determined as in Example 1. The results obtained are shown in Table 2.

Table 2

| Sample | No formation of cracks | Slight formation of fine cracks | Slight formation of cracks due to drying and shrinkage | Slight formation of cracks with efflorescence | Intersection of cracks | Cracks proceeding into interior | Formation of cracks in great numbers |
|---|---|---|---|---|---|---|---|
| I (Control) | 0 | 2 | 4 | 6 | 11 | 16 | — |
| II (Control) | 0 | 5 | 9 | 12 | — | — | — |
| III (Invention) | 0 | 8 | 16 | — | — | — | — |

EXAMPLE 3

Six hundred parts by weight of portland cement, 150 parts by weight of sand and 720 parts by weight of water (water to cement ratio = 1.2) as well as appropriate amounts of saponin and hydroxypropylmethyl cellulose were mixed to prepare a foaming mortar to be used for preparing finally an aerated concrete having an apparent specific gravity of 0.8.

The foregoing mortar was poured into a vertical form having the inside dimensions of 900 × 900 × 20 mm and, after curing the poured mortar for 24 hours at 70% relative humidity and 25° C., the form was removed, whereupon was obtained a sheet structure composed of aerated concrete and having the dimensions of 900 × 900 × 20 mm and an apparent specific gravity of about 0.8. This is designated sample I.

Six hundred parts by weight of portland cement, 150 parts by weight of sand, 720 parts of water and 3 parts by weight of polyamide short fibers 40 microns in diameter and 15 mm in length as well as appropriate amounts of saponin and hydroxypropylmethyl cellulose were mixed to prepare a short fiber-containing foaming mortar to be used for providing an aerated concrete having an apparent specific gravity of 0.8.

This mortar was poured into a form of the same kind as that used hereinbefore and cured under the conditions indicated above to obtain a sheet structure having the dimensions of 900 × 900 × 20 mm and composed of short fiber-containing aerated concrete having an apparent specific gravity of about 0.8. This structure is designated sample II.

Next, to the opposing inner walls of a form of the same kind as that used above (two surfaces having the dimensions of 900 × 900 mm) were adhered to the whole surfaces plain weave fabrics of coarse mesh such as that used in Example 1. Into the so prepared form was poured the same short fiber-containing foaming mortar as that used hereinabove, followed by curing the poured mortar under identical conditions as indicated above to obtain a sheet structure having an apparent specific gravity of about 0.8 and the dimemsions of 900 × 900 × 20 mm. This is designated sample III. Sample III has a structure which is characterized in that at the top and bottom surface zones of a sheet material composed of hardened foaming mortar in which have been uniformly dispersed polyamide short fibers there are present the foregoing plain weave fabrics with said short fibers and the plain weave fabrics being in a state of intertwinement.

Two sheets of each of the samples I, II and III were prepared, and each was supported horizontally with the point of support being 22.5 cm from one end of the sheet, after which the sheet was left to stand in this state in open air for 16 weeks (April – July), the state of crack formation during this period being determined as in Example 1. The results obtained are shown in Table 3.

As control, a sheet structure having the dimensions of 300 × 600 × 4 mm was prepared from a cement paste of water to cement ratio of 0.4. In this case a form of the same kind as that used above was used, and the removal of the excess water by application of pressure and the steam curing were carried out in the same manner as in the foregoing instance. The resulting structure is designated sample II. Twenty sheets of sample II were prepared. Sample II is a sheet material composed of the hardened cement paste but does not contain the short fibers and the plain weave fabric.

By way of comparison, samples I and II, after removal of the forms, were cured by air drying for three weeks, following which they were submitted to a destruction test. The destruction test is carried out in the following manner. The sample to be tested is placed atop a round steel bar 20 mm in diameter lying on a table, the sample being positioned such that it is supported at its middle part with the longitudinal side of the sample at right angles to the axis of the round bar. The two ends of the Table 3

| Sample | No formation of cracks | Slight formation of fine cracks | Slight formation of cracks due to drying and shrinkage | Slight formation of cracks with efflorescence | Intersection of cracks | Cracks proceeding into interior | Formation of cracks in great numbers |
| --- | --- | --- | --- | --- | --- | --- | --- |
| I (Control) | 0 | 2 | 3 | 4 | 6 | 9 | 16 |
| II (Control) | 0 | 4 | 6 | 10 | 16 | — | — |
| III (Invention) | 0 | 6 | 13 | — | — | — | — |

By operating in the same manner as described above, sheet structures having apparent specific gravities of about 0.5, 0.6, 1.0 and 1.2 were made and tested. The results obtained in this case were substantially identical to those shown in Table 3.

EXAMPLE 4

A cement paste of water to cement ratio of 0.4 and containing 1.5% by weight based on the cement of short fibers of poly-epsilon-capramide 45 microns in diameter and 20 mm in length was prepared.

The bottom of a horizontal form whose bottom dimensions were 300 × 600 mm was covered with a plain weave fabric of the same kind as used in Example 1 and having the dimensions of 300 × 600 mm. The foregoing cement paste was then spread over the foregoing cloth to a thickness of about 0.5 mm and, before the cement paste hardened, a plain weave fabric of the same kind as that used above was placed thereover. After these operations were repeated once more, a pressure of 6 – 7 kg/cm² was applied to the resulting structure from the top surface thereof to remove the excess water, followed by curing the structure for 5 hours in 60° – 70° C. steam of normal pressure and thereafter removal of the form. Thus was obtained a sheet structure having the dimensions of 300 × 600 × 4 mm. This is designated sample I. Twenty sheets of this sample I were prepared.

Sample I, as illustrated in FIG. 4, has a structure which is characterized in that at the top and bottom surface zones as well as the inner zone of a sheet material composed of a hardened cement paste (a) in which have been uniformly dispersed the foregoing short fibers (b) there are present the aforesaid plain weave fabrics (c) with said short fibers (b) in a state of intertwinement with said plain weave fabrics (c).

The results of the test show that of the 20 sheets only one was broken in the case of sample I (experiment according to the present invention), whereas 19 sheets of the 20 sheets were broken in the case of sample II (control).

What I claim:

1. A concrete structure comprising a hydraulic or air set cement, a cloth fabric having a sufficiently open weave to permit the passage of cement paste therethrough, said cloth being disposed in the whole of the surface zone of said structure and short fibers having a diameter of 5–100 microns and a length of 5–30 cm contained in an amount of from 0.2–2% based on the weight of cement, said short fibers being uniformly dispersed throughout the structure and a portion of said fibers being intertwined with said cloth fabric.

2. The concrete structure of claim 1 wherein the cloth fabric is a plain weave fabric containing 5–30 count yarns at a density of 10–25 ends per inch.

3. The concrete structure of claim 1 containing air bubbles therein.

4. A method of preparing concrete structure having a cloth fabric disposed in the whole of the surface zone thereof and short fibers uniformly dispersed throughout the structure with a portion of such fibers being intertwined with the cloth fabric, comprising disposing the cloth fabric adjacent to the whole of the inner walls of a form, filling said form with a cement slurry containing water, a material selected from hydraulic and air setting substances and from 0.2–2% based on the weight of said material of short fibers having a diameter of from 5–100 microns and a length of from 5–30 mm, curing said cement slurry and removing said form.

5. The method of claim 3 wherein said cloth fabric is a plain weave fabric containing 5–30 count yarns at a density of from 10 to 25 ends per inch.

6. The method of claim 3 wherein said cement slurry contains air bubbles.

7. The method of claim 5 wherein said plain weave fabric is treated with an aqueous solution of a water soluble resin selected from the group consisting of methyl cellulose, hydroxypropyl methyl cellulose, polyvinyl alcohol and polyvinyl pyrrolidone.

8. The method of claim 4 which further comprises disposing an additional cloth fabric in the form about midway between the walls of the form prior to filling said form with said cement slurry.

9. The method of claim 8 wherein said additional cloth fabric is a plain weave fabric containing 5–30 count yarns at a density of 10–25 ends per inch.

10. The method of preparing a concrete structure having a plain weave fabric disposed in the whole of the surface zone thereof and short fibers uniformly dispersed throughout the structure with a portion of such fibers being intertwined with said plain weave fabric, comprising placing said plain weave fabric at the whole of the bottom of a form, said plain weave fabric containing 5–30 count yarns at a density of 10–25 ends per inch, filling said form with a cement slurry containing water, a material selected from hydraulic and air setting substances and from 0.2 to 2% based on the weight of said material of short fibers having a diameter of from 5–100 microns and a length of from 5–30 millimeters, curing said cement slurry and removing said form.

11. The method of claim 10 wherein said form is a horizontal form further comprising prior to curing said cement slurry, placing additional plain weave fabric over said poured cement slurry, pouring additional cement slurry over said additional cloth, further covering said additional cement slurry with yet additional plain weave fabric, allowing the cement slurry to set and thereafter removing the form to thereby prepare a concrete structure of sheet form containing plain weave fabric at both the top and bottom surface zones thereof as well as plain weave fabric in the interior of said structure.

12. The method of preparing a concrete structure containing a plain weave fabric disposed in the whole of at least one surface zone thereof and short fibers uniformly dispersed throughout the structure with a portion of such fibers being intertwined with said plain weave fabric, comprising forming a layer of a cement slurry composed of water, a material selected from hydraulic and air setting substances and from 0.2–2% based on the weight of said material of short fibers having a diameter of from 5–100 microns and a length of from 5–30 mm, placing plain weave fabric containing 5–30 count yarns at a density of 10–25 ends per inch in contact with the whole of the exposed surface of said poured cement slurry and thereafter allowing the cement slurry to set.

13. The method of claim 12 further comprising, prior to allowing said cement slurry to set, forming an additional layer of said cement slurry over said plain weave fabric and placing additional plain weave fabric over the exposed surface of said additional layer of cement slurry and thereafter allowing the cement slurry to set.

* * * * *

UNITED STATES PATENT OFFICE
CERTIFICATE OF CORRECTION

Patent No. 4,021,258          Dated May 3, 1977

Inventor: SHINOBU UOGAESHI

It is certified that error appears in the above-identified patent and that said Letters Patent are hereby corrected as shown below:

Claim 1, line 6, delete "5-30 cm" and insert -- 5-30 mm --

Signed and Sealed this sixteenth Day of August 1977

[SEAL]

Attest:

RUTH C. MASON
*Attesting Officer*

C. MARSHALL DANN
*Commissioner of Patents and Trademarks*